(12) United States Patent
Lovera

(10) Patent No.: US 10,472,507 B2
(45) Date of Patent: Nov. 12, 2019

(54) POLYMER COMPOSITION HAVING IMPROVED IMPACT STRENGTH

(71) Applicant: SABIC GLOBAL TECHNOLOGIES B.V., Bergen op Zoom (NL)

(72) Inventor: Deliani Lovera, Bunde (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 42 days.

(21) Appl. No.: 15/776,864

(22) PCT Filed: Nov. 15, 2016

(86) PCT No.: PCT/EP2016/077721
§ 371 (c)(1),
(2) Date: May 17, 2018

(87) PCT Pub. No.: WO2017/085057
PCT Pub. Date: May 26, 2017

(65) Prior Publication Data
US 2018/0327581 A1 Nov. 15, 2018

(30) Foreign Application Priority Data
Nov. 17, 2015 (EP) ..................................... 15195014

(51) Int. Cl.
| | |
|---|---|
| C08L 23/06 | (2006.01) |
| C08L 23/12 | (2006.01) |
| C08L 23/10 | (2006.01) |
| B29C 49/00 | (2006.01) |
| B29D 22/00 | (2006.01) |
| C08L 23/14 | (2006.01) |
| C08L 53/00 | (2006.01) |
| B29K 23/00 | (2006.01) |

(52) U.S. Cl.
CPC .......... *C08L 23/12* (2013.01); *B29C 49/0005* (2013.01); *B29D 22/003* (2013.01); *C08L 23/06* (2013.01); *C08L 23/10* (2013.01); *C08L 23/14* (2013.01); *C08L 53/00* (2013.01); *B29K 2023/065* (2013.01); *B29K 2023/0625* (2013.01); *B29K 2023/0633* (2013.01); *B29K 2023/12* (2013.01); *B29K 2023/14* (2013.01); *C08L 2201/10* (2013.01); *C08L 2205/03* (2013.01); *C08L 2205/08* (2013.01); *C08L 2207/02* (2013.01); *C08L 2207/062* (2013.01); *C08L 2207/066* (2013.01)

(58) Field of Classification Search
CPC ...... C08L 23/10; C08L 23/04; C08L 23/0838; C08L 53/00; C08L 23/14; C08L 23/12; C08L 23/06; C08L 2205/03; C08L 2207/062; C08L 2207/066; C08L 2205/08; C08L 2201/10; B29D 22/003; B29C 49/0005; B29K 2023/14; B29K 2023/065; B29K 2023/0633; B29K 2023/0625
See application file for complete search history.

(56) References Cited

U.S. PATENT DOCUMENTS

| | | | |
|---|---|---|---|
| 4,282,076 A | 8/1981 | Boynton | |
| 4,399,054 A | 8/1983 | Ferraris et al. | |
| 4,472,524 A | 9/1984 | Albizzati | |
| 5,432,209 A | 7/1995 | Sobajima et al. | |
| 6,713,594 B2 | 3/2004 | Horn et al. | |
| 2007/0021560 A1 | 1/2007 | Tse et al. | |
| 2008/0251271 A1* | 10/2008 | Jeyakumar et al. | ... H01B 3/427 174/110 SR |
| 2009/0048399 A1 | 2/2009 | Reijntjens et al. | |
| 2013/0123413 A1 | 5/2013 | Lederer et al. | |
| 2014/0065397 A1* | 3/2014 | Johnson et al. | ........ B32B 27/08 428/220 |
| 2015/0099840 A1* | 4/2015 | Glogovsky et al. | .... C08L 23/12 524/400 |
| 2018/0186983 A1 | 7/2018 | Herklots et al. | |

FOREIGN PATENT DOCUMENTS

| | | |
|---|---|---|
| EP | 0063654 A1 | 11/1982 |
| EP | 0566141 A2 | 10/1993 |
| EP | 1344793 A1 | 9/2003 |
| EP | 1391482 A1 | 2/2004 |
| EP | 2386602 A1 | 11/2011 |
| WO | 9829482 A1 | 7/1998 |
| WO | 2006010414 A1 | 2/2006 |
| WO | 2010015539 A1 | 2/2010 |
| WO | 2013144060 A1 | 10/2013 |
| WO | 2017001280 A1 | 1/2017 |

OTHER PUBLICATIONS

International Search Report for International Application No. PCT/EP2016/077721; International Filing Date: Nov. 15, 2016; dated Feb. 16, 2017; 5 Pages.
Written Opinion of the International Searching Authority for International Application No. PCT/EP2016/077721; International Filing Date: Nov. 15, 2016; dated Feb. 16, 2017; 4 Pages.

* cited by examiner

*Primary Examiner* — Nathan M Nutter
(74) *Attorney, Agent, or Firm* — Cantor Colburn LLP

(57) ABSTRACT

The present invention relates to a polymer composition comprising: a) ≥40.0 and <95.0% by weight of one or more propylene-based polymer; b) ≥5.0 and <65.0% by weight of one or more ethylene-based polymer; and c) ≥0.1 and <10.0% by weight of one or more compatibiliser composition; with regard to the total weight of the polymer composition, wherein the propylene-based polymer a) is selected from a propylene homopolymer, a propylene random copolymer, and/or a heterophasic propylene copolymer; the ethylene-based polymer b) is selected from a low-density polyethylene, a linear low-density polyethylene, and/or a high-density polyethylene; and the compatibiliser composition c) comprises one or more polystyrene-poly(ethylene-propylene) block copolymer. Such polymer compositions have good impact strength, high melt strength, good optical properties such as transparency and gloss, and are sufficiently chemically inert. They may be used for the production of transparent containers for storing potable liquids.

15 Claims, No Drawings

POLYMER COMPOSITION HAVING IMPROVED IMPACT STRENGTH

CROSS REFERENCE TO RELATED APPLICATIONS

This application is a 371 of International Application No. PCT/ET2016/077721, filed Nov. 15, 2016, which claims priority to European Application No. 15195014.4 filed Nov. 17, 2015, which are incorporated herein by reference in their entirety.

The present invention relates to a polymer composition having improved impact strength. The invention also relates to the production of such polymer composition. The invention further relates to articles such as containers made using such polymer composition.

There is an existing market for containers for storing potable liquids having a volume of for example 0.01-0.05 m$^3$. Such containers may for example be used to store such potable liquids at temperatures of greater than the solidification temperature of such liquid and less than 50° C. Such containers may for example be positioned in dispenser devices from which one can tap said potable liquid. Examples of such potable liquids include water, non-carbonated beverages, and fruit juices.

Such containers need to comply to certain properties, such as for example a certain impact strength. Also, such containers need to be sufficiently transparent, in order to allow for example the identification of the liquid level inside the container. Also, such containers need to comply with regulations relating to public health. Materials used in the production of such containers must be of such nature that they do not allow for contamination of the products contained in them with regulated compounds beyond the tolerated levels provided by such regulations. With regulations becoming increasingly strict, the requirements on the materials used to manufacture such containers also continue to increase.

Polymer materials are widely used in the production of containers for products such as liquids. Polymers have a variety of properties that render them suitable for such application. For example in WO2003/080317A1, polycarbonate is mentioned for use in the production of containers for water. However, for certain applications, the inertness of such polycarbonates may not be sufficient.

A class of materials that are suitable for use in the production of containers for liquids are polyolefins. Polyolefins for example have a certain high chemical inertness, a certain good ability to be formed into complex shapes, and a certain good processability via thermal processing methods. Polyolefins are a material of choice for the production of a wide range of containers. Because of their inertness, polyolefin materials are particularly suitable materials to comply with the increasingly strict public health regulations.

However, polymer compositions according to the state of the art do not present a desired balance of impact strength, melt strength and optical properties in combination with a high degree of inertness. A certain high impact strength is required in order to allow for storing and handling of the containers. Good optical properties such as a high transparency is required to allow the observation of the contents of such container, for example for the consumer to see the level of the liquid left in the container. Good optical properties such as high gloss is desirable to ensure the containers are aesthetically appealable to the consumer.

Furthermore, it is a requirement for such compositions to have a high melt strength. The containers having such volume commonly are produced via extrusion blow moulding. In the production of containers via extrusion blow moulding, a so-called parison is produced by a melt extrusion process, which is kept at temperatures high enough to allow for a subsequent expansion of the internal volume to the size of the desired container by a introducing a blowing gas into the parison. In order for the parison and the formed container to maintain is form stability during the blow moulding part of the process, a high melt strength of the material is required. Such high melt strength reduces the occurrence of sagging or collapsing of the parison and the formed container.

Therefore, there is a clear need for polyolefin-based compositions that are suitable for the production of such containers, allowing for the production of containers that comply with public health regulations, have a required impact strength, melt strength and that are sufficiently transparent.

This objective has now been achieved according to the present invention by a polymer composition comprising:
  a) ≥30.0 and ≤95.0% by weight of one or more propylene-based polymer;
  b) ≥5.0 and ≤65.0% by weight of one or more ethylene-based polymer; and
  c) ≥0.5 and ≤10.0% by weight of one or more polystyrene-poly(ethylene-propylene) block copolymer
  with regard to the total weight of the polymer composition;
  wherein the propylene-based polymer a) is selected from a propylene homopolymer, a propylene random copolymer, and/or a heterophasic propylene copolymer; and
  wherein the ethylene-based polymer b) is selected from a low-density polyethylene, a linear low-density polyethylene, and/or a high-density polyethylene.

Such polymer compositions have good impact strength, high melt strength, good optical properties such as transparency and gloss, and are sufficiently chemically inert.

The use of such propylene-based polymer may contribute to desired stiffness and optical properties of the polymer compositions.

The use of such ethylene-based polymer composition may contribute to improved melt processability, for example improved melt elasticity of the polymer compositions. For example for use in processing methods such as blow moulding, polymer compositions require to have a certain high melt elasticity.

The use of such polystyrene-poly(ethylene-propylene) block copolymer may contribute to improved impact resistance and toughness. It is believed that the polystyrene blocks may impose a certain effect on the compatibility of the propylene-based polymer and the ethylene-based polymer.

The ratio of the weight of the ethylene-based polymer to the polystyrene-poly(ethylene-propylene) block copolymer may for example be ≥5.0, alternatively ≥7.0, alternatively ≥9.0. For example, the ratio of the weight of the ethylene-based polymer to the polystyrene-poly(ethylene-propylene) block copolymer may be ≤15.0, alternatively ≤13.0, alternatively ≤11.0. For example, the ration of the weight of the ethylene-based polymer to the polystyrene-poly(ethylene-propylene) block copolymer may be ≥5.0 and ≤15.0, alternatively ≥7.0 and ≤13.0. The application of polystyrene-poly(ethylene-propylene) block copolymer in such ratio to the ethylene-based polymer may for example result in the polystyrene-poly(ethylene-propylene) block copolymer being present at the interface of the propylene-based polymer and the ethylene-based polymer in such way to provide the desired compatibilisation effect.

The weight ratio of the of the ethylene-based polymer b) to the polystyrene-poly(ethylene-propylene) block copolymer c) preferably is ≥5.0 and ≤15.0.

The polymer composition according to the present invention may for example comprise ≥30.0% by weight of one of more propylene-based polymer, alternatively ≥40.0% by weight, alternatively ≥50.0% by weight, alternatively ≥60.0% by weight, with regard to the total weight of the polymer composition. The polymer composition may for example comprises ≤95.0% by weight of one of more propylene-based polymer, alternatively ≤90.0% by weight, alternatively ≤85.0% by weight, alternatively ≤80.0% by weight, alternatively ≤75.0% by weight, with regard to the total weight of the polymer composition. For example, the polymer composition may comprise ≥30.0% and ≤95.0% by weight, alternatively ≥40.0% and ≤85% by weight, alternatively ≥50.0% and ≤75.0% by weight of one of more propylene-based polymer, with regard to the total weight of the polymer composition.

The polymer composition according to the present invention may for example comprise ≥5.0% by weight of one or more ethylene-based polymer, alternatively ≥15.0% by weight, alternatively ≥25.0% by weight, with regard to the total weight of the polymer composition. The polymer composition may for example comprise ≤65.0% by weight of one or more ethylene-based polymer, alternatively ≤55.0% by weight, alternatively ≤45.0% by weight, with regard to the total weight of the polymer composition. For example, the polymer composition may comprise ≥5.0% and ≤65.0% by weight of one or more ethylene-based polymer, alternatively ≥25.0% and ≤45.0% by weight, with regard to the total weight of the polymer composition.

The polymer composition according to the present invention may for example comprise ≥0.5% by weight of one or more polystyrene-poly(ethylene-propylene) block copolymer, alternatively ≥1.0% by weight, alternatively ≥1.5% by weight, alternatively ≥2.0% by weight, with regard to the total weight of the polymer composition. The polymer composition may for example comprise ≤10.0% by weight of one or more polystyrene-poly(ethylene-propylene) block copolymer, alternatively ≤8.0% by weight, alternatively 6.0% by weight with regard to the total weight of the polymer composition. The polymer composition may for example comprise ≥0.5% and ≤10.0% by weight of one or more polystyrene-poly(ethylene-propylene) block copolymer, alternatively ≥2.0% and ≤6.0% by weight, with regard to the total weight of the polymer composition. Such polystyrene-poly(ethylene-propylene) block copolymer may also be referred to as an SEP rubber. The presence of SEP rubber in the polymer composition in such quantities may contribute to the desired compatibilisation effect taking place, whilst avoiding the formation of a separate SEP rubber phase which may occur when the quantity of SEP rubber in the polymer composition is too high. The formation of such separate rubber phase may negatively influence mechanical properties of the polymer composition.

The propylene-based polymer that is to be used according to the present invention may for example be a propylene homopolymer. Alternatively, the propylene-based polymer may be a propylene copolymer. Such propylene copolymer may be a propylene random copolymer. Alternatively, such propylene copolymer may be a heterophasic propylene copolymer.

The propylene-based polymer may for example have a melt mass flow rate as determined in accordance with ISO 1133-1 (2011), at a temperature of 230° C. and a load of 2.16 kg, of ≥1.0 and ≤10.0 g/10 min, alternatively ≥1.5 and ≤7.0 g/10 min, alternatively ≥2.0 and ≤5.0 g/10 min.

The propylene copolymer may for example comprise ≥0.5 and ≤7.0% by weight of polymeric units derived from one or more comonomers, alternatively ≥1.0 and ≤5.0% by weight. The comonomers may for example be one or more selected from ethylene, 1-butene, 1-pentene, 4-methyl-1-pentene, 1-hexene, 1-heptene and/or 1-octene. Preferably, the α-olefin comonomer is ethylene.

The heterophasic propylene copolymer may for example comprise a matrix phase and at least one dispersed phase. The matrix phase of the heterophasic propylene copolymer may for example comprise a propylene polymer such as a propylene homopolymer or a propylene-based copolymer. The matrix phase may for example comprise a propylene homopolymer. The propylene-based copolymer may for example be a copolymer of propylene and an α-olefin comonomer. The propylene-based copolymer may for example comprise ≤20.0%, alternatively ≤10.0%, alternatively ≤5.0% by weight with regard to the total weight of the propylene-based copolymer of monomeric units derived from an α-olefin comonomer. The propylene-based copolymer may comprise for example ≥0.5% by weight, alternatively ≥1.0% by weight, alternatively ≥2.0% by weight with regard to the total weight of the propylene-based copolymer of monomeric units derived from an α-olefin comonomer. The α-olefin comonomer may for example be selected from the groups of ethylene and/or α-olefins having ≥4 and ≤10 carbon atoms. In an embodiment, the α-olefin comonomer may for example be one or more selected from ethylene, 1-butene, 1-pentene, 4-methyl-1-pentene, 1-hexene, 1-heptene and/or 1-octene. Preferably, the α-olefin comonomer is ethylene.

The dispersed phase of the heterophasic propylene copolymer may for example comprise an ethylene-propylene elastomer. The ethylene-propylene elastomer may for example comprise ≥10.0% and ≤65.0 by weight, alternatively ≥20.0% and ≤50.0% by weight of polymeric units derived from ethylene, with regard to the total weight of the ethylene-propylene elastomer. The dispersed phase may for example be present in an amount of ≥5.0% and ≤40.0% by weight, alternatively ≥15.0% and ≤35.0% by weight, with regard to the total weight of the heterophasic propylene copolymer.

The fractions of matrix phase and dispersed phase of the heterophasic propylene copolymer may for example be determined via nuclear magnetic resonance spectroscopy (NMR) which is well known in the art. Other methods for determination thereof known in the art may also be used.

The propylene-based polymer may be produced via any process for the production of propylene-based polymers known in the art. Such processes may for example include one or more of gas-phase polymerisation processes, slurry-phase polymerisation processes, and solution polymerisation processes. Such processes may for example be catalytic polymerisation processes. Such catalytic polymerisation processes may for example be performed in the presence of one or more of a Ziegler-Natta type catalyst, a chromium-type catalyst, a single-site type catalyst such as a metallocene-type catalyst, or any other type of catalyst known in the art of production of propylene-based polymers. Such processes may for example involve a single polymerisation stage or alternatively multiple polymerisation stages. Such process involving multiple polymerisation stages may for example involve multiple polymerisation stages in series. Such multiple polymerisation stages may be performed in a single polymerisation reactor or in multiple polymerisation reactors. Such multiple stage polymerisation process may for example comprise one or more gas-phase polymerisation reactor, one or more slurry-phase polymerisation reactor, and/or one or more solution polymerisation reactor, or any combination of such reactors in any order.

The ethylene-based polymer that is to be used according to the present invention may for example be a homopolymer of ethylene. Alternatively, the ethylene-based polymer may be a copolymer of ethylene and at least one comonomer. Such comonomer may for example be used in such quantities as to make up ≤20.0% by weight of the polymeric units in the ethylene-based polymer, alternatively ≤10.0% by weight, alternatively ≤5.0% by weight, alternatively ≤3.0% by weight. Such comonomer may for example be used in such quantities as to make up ≥0.1% by weight of the polymeric units in the ethylene-based polymer, alternatively ≥0.5% by weight, alternatively ≥1.0% by weight. For example, the comonomer may be used in such quantities as to make up ≥0.5% and ≤5.0% by weight of the polymeric units, alternatively ≥1.0% and ≤3.0% by weight. Such comonomer may for examples be a mono-olefin or a di-olefin. Such mono-olefin may for example be an acyclic mono-olefin or a cyclic mono-olefin. Such acyclic mono-olefin may for example comprise 3 to 12 carbon atoms. Such acyclic mono-olefin may be for example a linear mono-olefin or a branched mono-olefin. Such acyclic mono-olefin may for example be selected from propylene, 1-butene, 1-pentene, 4-methyl-1-pentene, 1-hexene, 1-heptene and/or 1-octene. Preferably, the α-olefin comonomer is ethylene.

The ethylene-based polymer may for example be a low-density polyethylene. The ethylene-based polymer may for example be a linear low-density polyethylene. The ethylene-based polymer may for example be a high-density polyethylene.

Such low-density polyethylene may for example have a density of ≥900 and ≤935 kg/m$^3$, alternatively ≥910 and ≤930 kg/m$^3$. Such low-density polyethylene may for example be produced in a high-pressure free-radical polymerisation process. Such low-density polyethylene may for example be produced in a polymerisation process comprising a tubular reactor. Alternatively, such low-density polyethylene may for example be produced in a polymerisation process comprising an autoclave reactor.

Such linear low-density polyethylene may for example have a density of ≥900 and ≤940 kg/m$^3$, alternatively ≥910 and ≤925 kg/m$^3$. Such linear low-density polyethylene may for example be produced in a gas-phase polymerisation process, a slurry-phase polymerisation process, or a solution polymerisation process. Such processes may for example be catalytic polymerisation processes. Such catalytic polymerisation processes may for example be performed in the presence of one or more of a Ziegler-Natta type catalyst, a chromium-type catalyst, a single-site type catalyst such as a metallocene-type catalyst, or any other type of catalyst known in the art of production of propylene-based polymers. Such processes may for example involve a single polymerisation stage or alternatively multiple polymerisation stages.

Such high-density polyethylene may for example have a density of ≥941 and ≤975 kg/m$^3$, alternatively ≥950 and ≤965 kg/m$^3$. Such high-density polyethylene may for example be produced in a gas-phase polymerisation process, a slurry-phase polymerisation process, or a solution polymerisation process. Such processes may for example be catalytic polymerisation processes. Such catalytic polymerisation processes may for example be performed in the presence of one or more of a Ziegler-Natta type catalyst, a chromium-type catalyst, a single-site type catalyst such as a metallocene-type catalyst, or any other type of catalyst known in the art of production of propylene-based polymers. Such processes may for example involve a single polymerisation stage or alternatively multiple polymerisation stages.

In the context of the present invention, density is measured according to ISO 1183-1 (2012), method A.

The ethylene-based polymer may for example have a melt mass flow rate as determined in accordance with ISO 1133-1 (2011), at a temperature of 190° C. and a load of 2.16 kg, of ≥0.1 and ≤10.0 g/10 min, alternatively ≥0.5 and ≤5.0 g/10 min, alternatively ≥0.75 and ≤2.5 g/10 min.

Preferably, the ethylene-based polymer b) has a melt mass flow rate as determined in accordance with ISO 1133-1 (2011), at a temperature of 190° C. and a load of 2.16 kg, of ≥0.1 and ≤5.0 g/10 min.

The ethylene based polymer may have a molecular weight distribution as defined as the ratio between the weight average molecular weight $M_w$ and the number average molecular weight $M_n$, ($M_w/M_n$) as determined according to ISO 16014-1 (2012) of for example ≥3.0, alternatively ≥4.0, alternatively ≥5.0. For example, the ethylene-based polymer may have a molecular weight distribution of ≤40.0, alternatively ≤30.0, alternatively ≤20.0.

It is preferred that the polymer composition comprises an ethylene-based polymer b) having a molecular weight distribution as defined as the ratio between the weight average molecular weight $M_w$ and the number average molecular weight $M_n$, ($M_w/M_n$) as determined according to ISO 16014-1 (2012) of ≥3.0 and ≤40.0.

In an embodiment, the present invention relates to a polymer composition comprising:
  a) ≥30.0 and ≤95.0% by weight of a propylene copolymer;
  b) ≥5.0 and ≤65.0% by weight of a low density polyethylene; and
  c) ≥0.5 and ≤10.0% by weight of a polystyrene-poly(ethylene-propylene) block copolymer.

The polystyrene-poly(ethylene-propylene) block copolymer may for example have a melt mass flow rate as determined in accordance with ISO 1133-1 (2011), at a temperature of 230° C. and a load of 5.0 kg, of ≥10.0 and ≤15.0 g/10 min, alternatively ≥11.0 and ≥14.0 g/10 min.

It is further preferred that the polymer composition comprises a polystyrene-poly(ethylene-propylene) block copolymer having a melt mass flow rate as determined in accordance with ISO 1133-1 (2011), at a temperature of 230° C. and a load of 5.0 kg, of 10.0 and ≤15.0 g/10 min.

The polystyrene-poly(ethylene-propylene) block copolymer may for example have a styrene-based content of ≥10.0 and ≤25.0% by weight, alternatively ≥15.0 and ≤23.0% by weight, based on the total weight of the polystyrene-poly(ethylene-propylene) block It is also preferred that the polymer composition comprises a polystyrene-poly(ethylene-propylene) block copolymer having a styrene-based content of ≥10.0 and ≤25.0% by weight, based on the total weight of the polystyrene-poly(ethylene-propylene) block copolymer.

The styrene-based content is to be understood to be the weight fraction of the polystyrene-poly(ethylene-propylene) block copolymer that originates from monomers comprising a styrene moiety. The presence of such quantity of styrene-based content in the polystyrene-poly(ethylene-propylene) block copolymer may for example contribute to the desired compatibilisation effect of the propylene-based polymer and the ethylene-based polymer in the polymer composition. If the styrene-based content exceeds such quantity, this may result in poor compatibilisation; the SEP rubber may form a separate phase. If the styrene-content is below such quantity, the SEP rubber may not be located at the interfaces of the phases of the propylene-based polymer and the ethylene-based polymer but be dispersed in either of the phases, and therefor also may not provide the desired compatibilisation function.

The styrene-based content in the polystyrene-poly(ethylene-propylene) block copolymer may be determined by $^{13}$C NMR measurements, for example according to the following method in which samples of the block copolymer are dissolved in $D_2$-tetrachloro ethane ($C_2D_2Cl_4$) at for example 130° C. 2,6-di-tert-butyl-p-cresol (DBPC) may be added as an internal stabilizer. The $^{13}$C NMR measurements may be performed on a Bruker Avance III 500 MHz NMR spectrometer equipped with a 10 mm diameter cryo-cooled probehead operating at 125° C. The weight percentage of ethylene, propylene and styrene in the sample are obtained by analysing the $^{13}$C NMR spectra.

The present invention further concerns to a polymer composition wherein the polymer composition further comprises ≥1000 ppm and ≤3000 ppm of a clarifier with regard to the total weight of the polymer composition.

The clarifier may for example comprise one or more compounds selected from benzoic acid salts, dicarboxylate metal salts, hexahydrophthalic acid metal salts, phosphate ester salts, glycerolate salts, diamides, triamides, tetra-amides, pine rosin derivatives, diacetal derivatives, 2,6-naphthalene dicarboxamides, polyvinylcyclohexanes, and/or combinations thereof. In a preferred embodiment, the clarifier is a diacetal derivative, preferably a sorbitol diacetal. For example, the clarifier may be 1,3:2,4-bis(3,4-dimethylbenzylidene) sorbitol.

The clarifier may for example be used in quantities of ≥1000 ppm and ≤3000 ppm, alternatively ≥1500 ppm and ≤2500 ppm, with regard to the total weight of the polymer composition.

The polymer composition according to the present invention may for example be prepared by melt-mixing of the propylene-based polymer a), ethylene-based polymer b) and compatibiliser c). The melt-mixing may be done by any suitable means. For example, the melt-mixing may be done in one or more melt extruder. Preferably, the polymer composition is prepared by melt-mixing of the propylene-based polymer a), ethylene-based polymer b) and polystyrene-poly(ethylene-propylene) block copolymer c) in a twin-screw melt extruder.

The melt-mixing may be done in any order of combining the components a), b) and c). In the context of the present invention, melt-mixing may be understood to be the mixing of the propylene-based polymer a), the ethylene-based polymer b), the polystyrene-poly(ethylene-propylene) block copolymer c) and optionally other ingredients such as the clarifier at a temperature that exceeds the melt temperature of that of components a), b) and c) that has the highest melt temperature. For example, the melt-mixing may be performed at a temperature in the range ≥200° C. and ≤300° C.

In case one or more melt extruder is used for the melt-mixing, suitable conditions such as temperature, pressure, amount of shear, screw speed and screw configuration are known to the skilled person.

In case one or more melt extruder is used for the melt-mixing, conventional melt extruders may be used, such as co-rotating twin-screw extruders or counter-rotating twin-screw extruders. The temperature may vary along the subsequent zones of such extruder. For example, the temperature in the feed zone may in the range of 100° C. to 200° C., for example to ensure proper material flow through the extruder, whereas the temperature at the extruder die, i.e. the outlet of the extruder, may be in the range of 200° C. to 300° C., for example to ensure adequate mixing to occur. Too low temperatures may lead to inadequate mixing, and thus may lead to polymer compositions not having the desired material properties. Too high temperatures may lead to material degradation, which also may result in polymer compositions not having the desired material properties.

The extruder may for example be operated at screw speeds in the range of 100-400 rpm. Lower screw speeds may lead to inadequate mixing. Higher screw speeds may lead to material degradation as a result of shear forces.

Polymer compositions according to the present invention may for example be used in the production of containers via blow-moulding or extrusion blow-moulding. Such moulding processes are well known to the person skilled in the art. Preferably, the containers are produced via blow-moulding using a polymer composition according to the present invention.

Polymer compositions according to the present invention may also for example be used for the manufacturing of shaped articles.

The invention also relates to a container for storing liquids produced using the polymer composition according to the invention. Containers prepared using polymer compositions according to the present invention may for example be used for storing liquids. Containers prepared using polymer compositions according to the present invention may for example be used for storing in deep-frozen conditions, such as in storing at temperatures of as low as −25° C. In a preferred embodiment, the containers produced have an internal volume of ≥0.01 and ≤0.05 m³. In the context of the present invention, internal volume is to be understood to be the maximum volume of a container that may be used for storing liquids. It is preferred that the container has a total transmittance as determined according to ASTM D1003 (2000), method A of ≥75.0%. A container according to the present invention may be used for storing potable liquids.

As indicator for the impact strength, the Izod impact strength as determined according to ISO 180 (2000), type A at temperatures of −20° C., 0° C. and/or 23° C. may for example be used. Higher Izod impact strength values at indicate a higher impact strength.

As indicators for the transparency, the total transmittance as determined according to ASTM D1003 (2000), method A may for example be used. A higher total transmittance indicates a higher transparency.

As indicator for melt strength, the phase angle as determined via Dynamic Mechanical Spectrum (DMS) analysis of sample plates at frequencies of 0.01 rad/s, 0.10 rad/s and/or 1.00 rad/s may for example be used. A lower phase angle indicates a higher melt strength at a given frequency. The plates may be produces in accordance with ISO 1872-2 (2007). The phase angle determined at such low frequencies may be used as indicator for melt strength in processes such as blow moulding as during such blow moulding, the material is subjected to forces similar to the forces occurring in this regime frequency of phase angle determination.

According to the present invention, particularly preferred is a polymer composition comprising:
a) ≥40.0 and ≤95.0% by weight of one or more propylene-based polymer;
b) ≥5.0 and ≤65.0% by weight of one or more ethylene-based polymer; and
c) ≥0.1 and ≤10.0% by weight of one or more compatibiliser composition;
d) ≥1000 ppm and ≤3000 ppm of a clarifier
with regard to the total weight of the polymer composition;
wherein:
the propylene-based polymer a) is selected from a propylene random copolymer and/or a heterophasic propylene copolymer;
the ethylene-based polymer b) is selected from a low-density polyethylene, a linear low-density polyethylene, and/or a high-density polyethylene, having a melt mass flow rate as determined in accordance with ISO 1133-1 (2011), at a temperature of 190° C. and a load of 2.16 kg, of ≥0.1 and ≤5.0 g/10 min.;
the compatibiliser composition c) comprises one or more polystyrene-poly(ethylene-propylene) block copolymer having a melt mass flow rate as determined in accordance with ISO 1133-1 (2011), at a temperature of 230° C. and a load of 5.0 kg, of ≥10.0 and ≤15.0 g/10 min. and a styrene-based content of ≥10.0 and ≤25.0% by weight, based on the total weight of the polystyrene-poly(ethylene-propylene) block copolymer;
the ratio of the weight of the ethylene-based polymer b) to the weight of the compatibiliser c) is ≥5.0 and ≤15.0; and
the clarifier is 1,3:2,4-bis(3,4-dimethylbenzylidene) sorbitol.

The invention is also concerned with a container suitable for storing potable liquids produced using such polymer composition having an internal volume of ≥0.01 and ≤0.05 m³. It is preferred that such container has a total transmittance as determined according to ASTM D1003 (2000), method A of ≥75.0%.

The invention will now be illustrated by the following non-limiting examples.

EXPERIMENT I

Preparation of Polymer Compositions

In a 25 mm twin screw melt extruder, operated at a temperature of 210° C. at a speed of 250 RPM, granules of polymer compositions were prepared for each of the polymer composition presented in table I.

TABLE I

| | Example | | | | | | | |
|---|---|---|---|---|---|---|---|---|
| | I | II | III | IV (C) | V (C) | VI (C) | VII (C) | VIII (C) |
| Propylene-based polymer | 68.0 PP-B | 47.5 PP-B | 47.5 PP-A | 70.0 PP-B | 50.0 PP-B | 50.0 PP-A | 100.0 PP-B | 100.0 PP-A |
| Ethylene-based polymer | 29.0 | 47.5 | 47.5 | 30.0 | 50.0 | 50.0 | | |
| Compatibiliser | 3.0 | 5.0 | 5.0 | | | | | |

The quantities of ingredients presented in table I are in % by weight compared to the total weight of the polymer composition.

Examples I through III present examples according to the invention. Examples IV through VIII present comparative examples.

The propylene-based polymer PP-A that was used in the presented examples was a commercial polypropylene grade QR 681K, obtainable from SABIC, having a melt mass flow rate as measured according to ISO 1133-1 (2011) at a temperature of 230° C. and a load of 2.16 kg of 2.2 g/10 min.

The propylene-based polymer PP-B that was used in the presented examples was a commercial polypropylene grade CPC04C, obtainable from SABIC, having a melt mass flow rate as measured according to ISO 1133-1 (2011) at a temperature of 230° C. and a load of 2.16 kg of 4.0 g/10 min.

The ethylene-based polymer that was used in the presented examples was a commercial low-density polyethylene grade 2501TN00W, obtainable from SABIC, having a melt mass flow rate as measured according to ISO 1133-1 (2011) at a temperature of 190° C. and a load of 2.16 kg of 0.75 g/10 min and a density as determined according to ISO 1183-1 (2012), method A of 925 kg/m³.

The compatibiliser that was used in the presented examples was a commercial polystyrene-poly(ethylene-propylene) block copolymer grade G1730, obtainable from Kraton, having a melt mass flow rate as measured according to ISO 1133-1 (2011) at a temperature of 230° C. and a load of 5.00 kg of 13.0 g/10 min, and a styrene-based content of 21.0% by weight, based on the total weight of the polystyrene-poly(ethylene-propylene) block copolymer.

EXPERIMENT II

Determination of Material Properties

The polymer compositions obtained from Experiment I were tested to determine the material properties. In table II, the determined properties and the obtained values for the experimental examples are presented.

TABLE II

| Property | | Unit | I | II | III | IV (C) | V (C) | VI (C) | VII (C) | VIII (C) |
|---|---|---|---|---|---|---|---|---|---|---|
| Izod | −20° C. | kJ/m² | 2.76 | 8.63 | 5.11 | 1.62 | 1.95 | 1.65 | 1.56 | 1.62 |
| impact | 0° C. | | | 60.49 | 68.65 | | 35.03 | 4.98 | | 1.50 |
| strength | 23° C. | | | 68.34 | 68.32 | 72.07 | 33.44 | 59.69 | 48.86 | 38.46 | 32.61 |
| Flexural modulus | | MPa | 736 | 508 | 487 | 790 | 605 | 560 | 1168 | 1059 |
| Secant modulus | | MPa | | 499 | 458 | | 579 | 520 | 1129 | 962 |
| Yield strength | | MPa | 19.9 | 15.7 | 15.1 | 20.8 | 17.2 | 16.6 | 27.5 | 26.3 |
| Elongation at break | | % | 568 | 582 | 458 | 298 | 397 | 374 | 219 | 422 |
| Haze | | % | 66 | 69 | 72 | 68 | 76 | 79 | 43.2 | 22 |
| Total transmittance | | % | 76.2 | 72.2 | 71.3 | 76.4 | 72.0 | 71.3 | 79.8 | 84.2 |
| Gloss 85° | | GU | | 91.4 | 95.1 | | 92.4 | 94.2 | 97.9 | 98.0 |
| Phase | 0.01 rad/s | ° | | | 73 | | | 76 | | 84 |
| angle | 0.10 rad/s | ° | | | 71 | | | 72 | | 78 |
| | 1.00 rad/s | ° | | | 60 | | | 61 | | 68 |

The Izod impact strength was measured in accordance with ISO 180 (2000), type A. ISO 180 (2000) relates to determination of Izod impact strength of plastics.

The flexural modulus and secant modulus were measured in accordance with ASTM D790 (2010), method A. ASTM D790 (2010) relates to standard test methods for flexural properties of unreinforced and reinforced plastics and electrical insulating materials.

The yield strength and the elongation at break were measured in accordance with ISO 527-1 (2012). ISO 527-1 (2012) relates to determination of tensile properties of plastics.

The total transmittance was measured in accordance with ASTM D1003 (2000), method A. ASTM D1003 (2000) relates to a standard test method for haze and luminous transmittance of transparent plastics.

The gloss at 85° was measured in accordance with ISO 2813 (2014). ISO 2813 (2014) relates to determination of gloss values of paints and varnishes.

The phase angle was determined via DMS using plates of 0.5 mm thickness produced according to ISO 1872-2 (2007). For determining the DMS spectrum, an ARES 4/A14 rheometer was used at 200° C. measuring at frequencies of 0.01 rad/s to 300 rad/s, at a linear viscoelastic strain of 5%.

The examples presented above show that the addition of an amount of a compatibiliser comprising a polystyrene-poly(ethylene-propylene) block copolymer to a polymer composition comprising a propylene-based polymer and an ethylene-based polymer leads to improved Izod impact strength at different temperatures (−20° C., 0° C., 23° C.), as well as to an improved elongation at break and a reduction of haze, whilst at the same time the flexural modulus, the yield strength, the gloss and the transmittance are maintained. Furthermore, the melt strength was improved.

The invention claimed is:

1. Polymer composition comprising:
  a) ≥40.0 and ≤95.0% by weight of a propylene-based polymer;
  b) ≥5.0 and ≤65.0% by weight of an ethylene-based polymer; and
  c) ≥0.1 and ≤10.0% by weight of a compatibiliser composition;
  with regard to the total weight of the polymer composition;
  wherein the propylene-based polymer a) is selected from a propylene homopolymer, a propylene random copolymer, and/or a heterophasic propylene copolymer;
  wherein the ethylene-based polymer b) is selected from a low-density polyethylene, a linear low-density polyethylene, and/or a high-density polyethylene; and
  wherein the compatibiliser composition c) comprises a polystyrene-poly(ethylene-propylene) block copolymer.

2. Polymer composition according to claim 1, wherein the ratio of the weight of the ethylene-based polymer b) to the weight of the compatibiliser c) is ≥5.0 and ≤15.0.

3. Polymer composition according to claim 1, wherein the ethylene-based polymer b) has a melt mass flow rate as determined in accordance with ISO 1133-1 (2011), at a temperature of 190° C. and a load of 2.16 kg, of ≥0.1 and ≤5.0 g/10 min.

4. Polymer composition according to claim 1, wherein the ethylene-based polymer b) has a molecular weight distribution as defined as the ratio between the weight average molecular weight $M_w$ and the number average molecular weight $M_n$, ($M_w/M_n$,) as determined according to ISO 16014-1 (2012) of ≥3.0 and ≤40.0.

5. Polymer composition according to claim 1, wherein the polystyrene-poly(ethylene-propylene) block copolymer has a melt mass flow rate as determined in accordance with ISO 1133-1 (2011), at a temperature of 230° C. and a load of 5.0 kg, of ≥10.0 and ≤15.0 g/10 min.

6. Polymer composition according to claim 1, wherein the polystyrene-poly(ethylene-propylene) block copolymer has a styrene-based content of ≥10.0 and ≤25.0% by weight, based on the total weight of the polystyrene-poly(ethylene-propylene) block copolymer.

7. Polymer composition according to claim 1, wherein the polymer composition further comprises ≥1000 ppm and ≤3000 ppm of a clarifier with regard to the total weight of the polymer composition.

8. Polymer composition according to claim 1, wherein the polymer composition is prepared by melt-mixing of the propylene-based polymer a), ethylene-based polymer b) and polystyrene-poly(ethylene-propylene) block copolymer c) in a twin-screw melt extruder.

9. Process for the production of a polymer composition according to claim 1, wherein the propylene-based polymer a), ethylene-based polymer b) and polystyrene-poly(ethylene-propylene) block copolymer c) are subjected to melt-mixing in a twin-screw extruder.

10. Process for the production of a container using a polymer composition according to claim 1, via blow-moulding.

11. Container for storing liquids produced using the polymer composition according to claim 1.

12. Container for storing liquids produced according to the process of claim 10.

13. Container according to claim 11, wherein the container has an internal volume of ≥0.01 and ≤0.05 m³.

14. Container according to claim 11, wherein the container has a total transmittance as determined according to ASTM D1003 (2000), method A of ≥75.0%.

15. A method for storing potable liquid, comprising disposing the potable liquid into the container of claim 10.

* * * * *